United States Patent Office 2,768,276
Patented Oct. 23, 1956

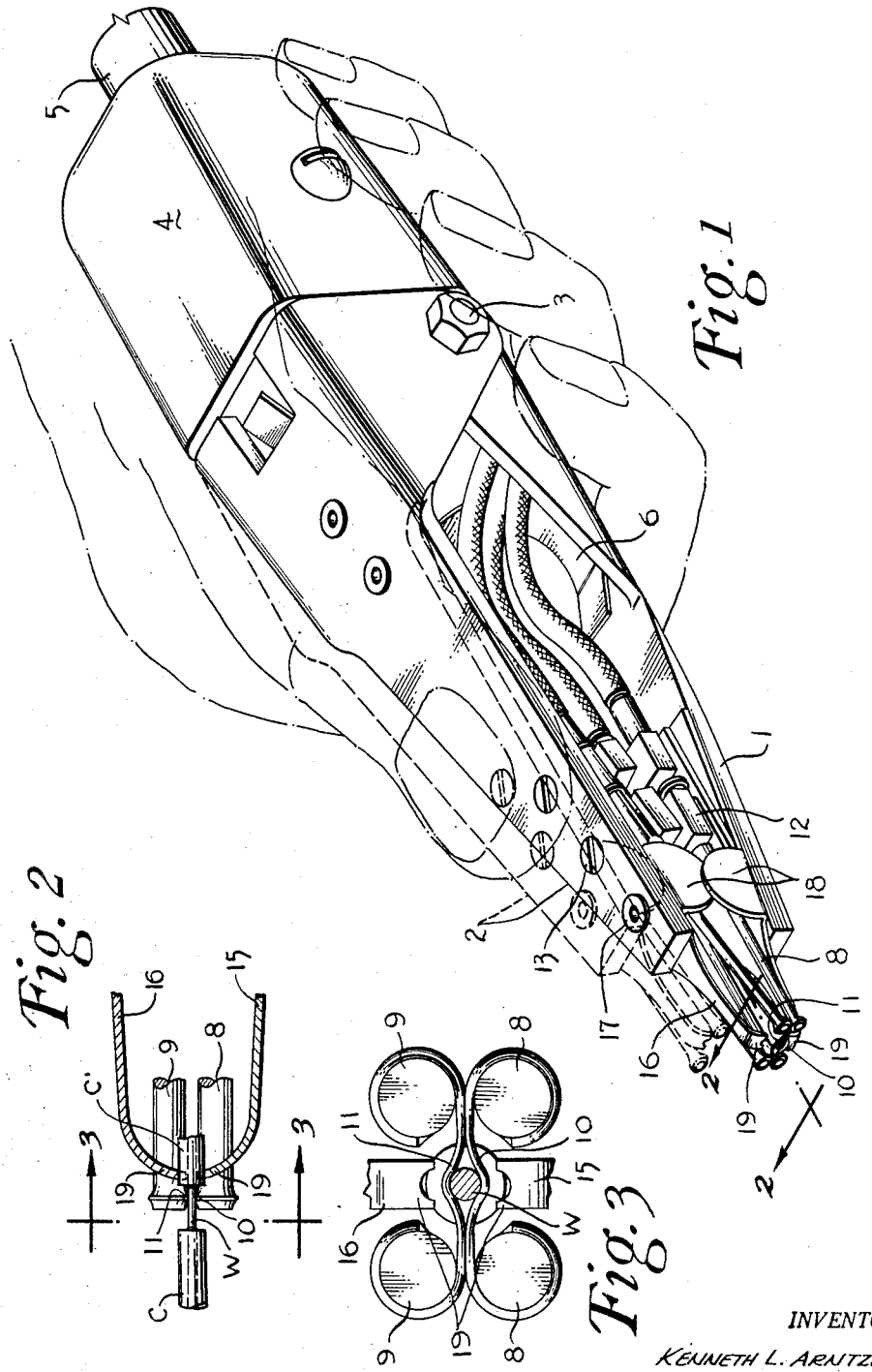

2,768,276

HOT TIP WIRE STRIPPER

Kenneth L. Arntzen, Seattle, Wash., assignor to Boeing Airplane Company, Seattle, Wash., a corporation of Delaware Application September 16, 1955, Serial No. 534,700

6 Claims. (Cl. 219—29)

In the installation of wiring there is constant need for stripping the insulation from the tip of a length of wire, to a predetermined distance back from the tip, preparatory to connecting the wire end to a terminal, both electrically and mechanically. It has been proposed heretofore to accomplish this by jaws which embrace the insulation and are sharpened to bite into the same to the bare wire, after which these same jaws are pulled lengthwise of the wire to strip the insulation from the wire tip. In such devices, the jaws which accomplish the mechanical act of stripping are the same jaws which accomplish the mechanical severance of the insulation to be stripped from the insulation which remains, hence they must be rugged, and they dull easily and quickly.

It has also been proposed to heat such stripping tools, or at least the gripping jaws thereof, so that they will the more readily melt and cut through the insulation coating, but if such heated jaws are strong enough to withstand the force required for stripping, they are somewhat heavy to heat readily, or to confine the heat to a small locality, and the necessity for extensive heat insulation complicates the design of the tool. Moreover, such heated gripping jaws tend to melt through that portion of the insulation which is to be removed, and it is not removed cleanly, in one piece.

There are other tools in which either of the above arrangements, but not both, are provided for severing and stripping the insulation, and in which the insulation that is to be left is gripped and held, in one way or another, against the pull during the time the stripping jaws are removing that portion which is to be removed.

All such tools leave something to be desired. It has been found preferable to use fine, locally heated elements, so mounted that they require no special heat insulation, for the sole purpose of severing or cutting through the insulation down to the bare wire, and to use other and mechanically stronger means for the separate purpose of stripping and removing the severed insulation tip from the wire tip. It has been found unnecessary to grip or restrain the insulation which is to remain in place, provided the severance on the one hand is clean, and the portion of the insulation to be removed, on the other hand, is firmly enough gripped that it will strip off cleanly after severance.

The tool of the present invention operates according to the plan just indicated, and is an improvement over prior tools of the same general class in that it includes light, thin heated wires which have as their sole function the severance of the portion of the insulation to be removed from that which is to be left, cleanly and quickly, by heat alone, and has, in addition, separate and stronger gripping fingers that mechanically grip the portion of insulation to be removed, and remove it quickly and cleanly, without strain on the more fragile heated wires. The present tool has no means for gripping the insulation which is to be left, since, when that portion which is to be removed is cleanly severed and firmly stripped, there is no need to grip the portion of the insulation which is to remain.

It is, of course, an object to provide a tool of the general nature indicated which shall be simple in construction, easy to operate by one hand, which has parts so arranged that should any part become worn or damaged, or should the hot wires burn through, the defective part can be quickly and readily replaced.

It is also an object to provide a tool of the nature indicated in which the hot portions are of small size and well segregated from the remainder of the tool, so that there is nothing except such fine wires that is required to heat up, and in which spring gripping fingers are separate from the heated portions of the tool, so that the temper of the spring is not affected by the heat, and the parts which must be yieldable and resilient in order to function properly with wires and insulation of different gauge are properly resilient and adapted to numerous gauges.

With such objects in mind, and others as will appear hereinafter, the present invention comprises the novel tool and the novel combination and arrangement of the parts thereof, as shown in the accompanying drawings in a representative form and as will be more fully explained hereafter, and the features which constitute this invention will be defined in the claims.

Figure 1 is an isometric view of the tool shown in full lines in its closed position, and in dash lines in its open position.

Figure 2 is in general a detail sectional view along the line indicated at 2—2 in Figure 1.

Figure 3 is an end elevational view taken from the viewpoint indicated at 3—3 in Figure 2, illustrating the hot wires and their immediate supports and the cooperating gripping fingers.

The tool comprises, in effect, two jaws 1 and 2 hingedly connected at 3 upon a base 4, the latter (and if desired, the jaws also) preferably of electrical insulating material, into which the lead wires extend for heating the severing wires to be referred to hereinafter. Such lead-in wires have been omitted from the showing, but would enter by way of the conduit 5. The two jaws are normally held apart by a spring means, such as the leaf spring 6 interposed between the jaws 1 and 2. The tool is of a size to be nicely and conveniently received in the palm of the user's hand, as illustrated in dot-dash lines in Figure 1.

At the tip of each of the jaws 1 and 2 are mounted a pair of posts. The numeral 8 represents the posts on the jaw 1 and the numeral 9, the posts on the jaw 2, although there is no distinction nor difference of structure between such posts 8 and 9. These posts might project laterally from the jaws, but preferably are directed in the same longitudinal direction as the jaws. They serve as supports for small like wires 10 and 11, carried by the respective posts 8 and 9, and which are directed transversely of the position of the wire to be stripped. These wires 10 and 11 are wrapped about and silver-soldered, or otherwise secured, to the respective posts 8 and 9. They may be oppositely bowed, as in Figure 3, or, if left straight, will ordinarily assume somewhat of a bowed shape from use as they are pressed about the work piece wire W. Because the posts 8, 9 are of large gauge as compared to the wires 10, 11, and of much less electrical resistance, the posts are but slightly heated, by conduction only. Virtually all heat is concentrated in the wires 10, 11, and since they are located at the tips of the cool posts 8, 9, no provision for heat insulation is needed. The wires 10, 11 will heat up rapidly, so that it is feasible to incorporate a switch in circuit therewith, and located for closure between the jaws 1, 2, to close the circuit only whenever the wires 10, 11 are closed upon an insulation sheath.

It is preferred that the posts 8 and 9 be formed as jacks received in sockets within electrically insulating blocks 12 which are mounted in the respective jaws, being held in place therein by screws 13. By this means, should any wire 10 or 11 burn through or become damaged, or, if for any reason the posts or their wires become corroded or defective, it is a simple matter to remove them and to replace them.

The paired posts 8 and the paired posts 9 are spaced apart sufficiently to lie at opposite sides of, and spaced from, any wire W which the particular tool may be called upon to strip. The work is conveniently accessible and visible, and the posts project a material distance from the ends of the respective jaws. Intermediate the paired posts, and directed lengthwise of the jaws, are spring metal gripper fingers designated 15, for the one which is mounted upon the jaw 1, and 16 for the one which is mounted upon the jaw 2. Again, these are alike. They are fixed to the respective jaws, as for instance by rivets 17 through their base, and they are preferably provided with lateral guide plates or flanges 18 which engage and slip by each other to prevent lateral relative displacement of the jaws and of the hot wires 10 and 11 at the tips of the jaws. The outer ends of the gripper fingers 15 and 16 are inwardly turned, as indicated at 19, and preferably also are notched (see Figure 3) so that they will closely embrace a wire W or will bite into the insulation C and firmly grip the same. These inwardly directed tips 19 are located towards the inserted end of the portion C' of the insulation which is to be removed, from the hot wires 10 and 11, so that this portion C' is gripped firmly, but the insulation beyond the hot wires 10 and 11 is not gripped at all.

When a stripping operation is required, the wire with its insulation is inserted with its tip between the wires 10 and 11 to the extent required. The jaws are then urged together, and the now hot wires 10 and 11 cut through the insulation and sever the portion C' from the remaining portion C. Slight rotation of the tool about the wire W will insure complete severance. The posts are somewhat resilient, so that if they come into contact they will still yield without breaking or straining. At the same time, the spring-like gripping members 15, 16 engage the portion C' by their inwardly turned tips 19, whereupon by drawing the tool outwardly along the wire W the severed portion C' of the insulation is removed cleanly, with no strain on the hot wires. This severed portion is retained and can be dropped on the floor, or if required, within a receptacle. The operation is a simple and rapid one, and the parts that it is necessary to grip are firmly gripped, whereas those that need not be gripped are left free and, in consequence, there is no particular strain on the delicate parts of the tool.

I claim as my invention:

1. A wire stripping tool comprising a pair of complemental jaws hingedly connected for approach and recession, spring means yieldingly holding said jaws apart, a pair of electrically heated wires disposed in parallelism and carried by the respective jaws in position to engage and melt transversely through the insulation of the wire to be stripped, and the end whereof has been entered between the jaws, along a line which is located a distance from the tip thereof equivalent to the length of insulation to be removed, and a pair of gripper fingers likewise carried by the respective jaws, and located to engage the length of insulation to be removed while the heated wires are in engagement therewith, at locations intermediate the line of the heated wires and the insulation's tip.

2. A wire stripping tool as in claim 1, including two posts projecting lengthwise of each jaw, at opposite sides of the location assumed by the length of the wire to be stripped, the respective heated wires extending transversely between and being mounted upon the two such posts of the respective jaws, and the gripper fingers likewise extending lengthwise of the jaws and each positioned intermediate the two posts of the corresponding jaw.

3. A wire stripping tool as in claim 2, wherein the gripper fingers are formed of spring metal, and each is inwardly flanged at its outer tip, to engage the insulation along a narrow transverse line.

4. A wire stripping tool as in claim 3, wherein the inwardly flanged tip of each gripper finger is notched to embrace the insulation to be removed.

5. A wire stripping tool as in claim 2, including lateral guide plates carried by the respective jaws in position to overlap as the jaws approach.

6. A wire stripping tool comprising a pair of jaws interconnected and guided for approach and recession, two pairs of posts of low electrical resistance, one pair, in spaced relation, being mounted upon each jaw, a fine wire of high electrical resistance, as compared to the posts, mounted upon and extending between the posts of each pair, and each generally opposite the other to engage opposite sides of insulation to be severed, circuit means leading through said posts and the respective fine wires, to heat the latter, and separate gripping means carried by the jaws in position, intermediate the paired posts, to engage the portion of the insulation which is to be removed, upon closure of the jaws to sever such portion with the heated fine wires.

References Cited in the file of this patent

UNITED STATES PATENTS 2,192,056    Watts _____ Feb. 27, 1940

FOREIGN PATENTS 144,966    Switzerland _____ Apr. 16, 1931